United States Patent
Lee et al.

(10) Patent No.: US 8,264,175 B2
(45) Date of Patent: Sep. 11, 2012

(54) METHOD FOR FORMING A CAPACITOR MODULE CIRCUIT IN AN INVERTER USING IMPEDANCE MATCHING

(75) Inventors: Jeong Yun Lee, Gwangju (KR); Dong Min Shin, Hwaseong (KR); Woo Yong Jeon, Seoul (KR); In Pil Yoo, Seoul (KR); Ki Young Jang, Gyeonggi-do (KR); Sang Cheol Shin, Gyeonggi-do (KR); Jin Hwan Jung, Gyeonggi-do (KR); Jung Hong Joo, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 91 days.

(21) Appl. No.: 12/767,169

(22) Filed: Apr. 26, 2010

(65) Prior Publication Data

US 2011/0094075 A1    Apr. 28, 2011

(30) Foreign Application Priority Data

Oct. 26, 2009    (KR) .................. 10-2009-0101514

(51) Int. Cl.
*H02P 5/00*    (2006.01)
(52) U.S. Cl. .......... 318/139; 318/85; 318/440; 324/548; 29/25.41
(58) Field of Classification Search .............. 29/825, 29/596–598, 732–736, 25.42; 318/139, 440, 318/599, 606; 320/138; 324/548, 537
See application file for complete search history.

(56) References Cited

U.S. PATENT DOCUMENTS

| | | | | |
|---|---|---|---|---|
| 4,879,639 A | * | 11/1989 | Tsukahara | 363/37 |
| 5,804,973 A | * | 9/1998 | Shinohara et al. | 324/548 |
| 5,914,582 A | * | 6/1999 | Takamoto et al. | 318/801 |
| 6,096,693 A | | 8/2000 | Nakanishi et al. | |
| 6,541,427 B1 | | 4/2003 | Dresel | |
| 6,562,765 B1 | | 5/2003 | Boffa | |
| 6,630,804 B2 | * | 10/2003 | Moriya et al. | 318/85 |
| 6,852,679 B2 | | 2/2005 | Hartley et al. | |
| 7,018,958 B2 | | 3/2006 | Arrowsmith et al. | |
| 7,057,361 B2 | * | 6/2006 | Kitahata et al. | 318/139 |
| 7,561,389 B2 | | 7/2009 | Ishikawa et al. | |
| 7,855,527 B2 | * | 12/2010 | Goto et al. | 318/801 |

FOREIGN PATENT DOCUMENTS

| | | | |
|---|---|---|---|
| JP | 2001-045767 A | | 2/2001 |
| JP | 2001-309505 A | | 11/2001 |
| JP | 2002-078352 A | | 3/2002 |
| JP | 2004-088951 A | | 3/2004 |
| JP | 2008-193788 A | | 8/2008 |
| JP | 2004-364345 | * | 12/2011 |
| KR | 10-2005-0041288 | | 5/2005 |

* cited by examiner

*Primary Examiner* — Minh Trinh
(74) *Attorney, Agent, or Firm* — Edwards Wildman Palmer LLP; Peter F. Corless

(57) ABSTRACT

The present invention is directed to methods for forming an inverter circuit for operating a drive motor of an electric vehicle, which can more effectively reduce the switching noise generated by a power module during the operation of an inverter.

8 Claims, 5 Drawing Sheets

METHOD FOR FORMING A CAPACITOR MODULE CIRCUIT IN AN INVERTER USING IMPEDANCE MATCHING

CROSS-REFERENCE TO RELATED APPLICATION

This application claims under 35 U.S.C. §119(a) the benefit of Korean Patent Application No. 10-2009-0101514 filed Oct. 26, 2009, the entire contents of which are incorporated herein by reference.

BACKGROUND (a) Technical Field

The present disclosure relates, generally, to a method for forming an inverter circuit. More particularly, it relates to a method for forming a capacitor module circuit in an inverter for driving a drive motor of an electric vehicle.

(b) Background Art

A hybrid vehicle is generally meant to refer to a vehicle driven by efficiently combining at least two different types of power sources. In most cases, the hybrid vehicle is driven by an engine (e.g., an internal combustion engine) which generates a rotational force by burning fuel (e.g., fossil fuel such as gasoline) and an electric motor which generates a rotational force with the electric power of a battery. Such an exemplary hybrid vehicle is typically referred to as a hybrid electric vehicle (HEV).

The hybrid vehicle is driven in an electric vehicle (EV) mode, which is directed to a pure electric vehicle mode using only the power of the electric motor (or drive motor), in a hybrid electric vehicle (HEV) mode, which is an auxiliary mode using the rotational force of the drive motor as an auxiliary power source with the use of the rotational force of the engine as a main power source, or in a regenerative braking (RB) mode, in which braking energy or inertia energy of the vehicle produced by braking or during driving by inertia is recovered by power generation of the drive motor and charged in a battery.

A hybrid vehicle typically includes a battery (e.g., a high voltage battery), which repeats charge and discharge during operation of the vehicle to supply electric power required for driving the drive motor, and an inverter for rotating the drive motor by the power of the battery.

The battery supplies required electric power and is charged with electric power generated by the drive motor during regenerative braking, and the inverter inverts the phase of the electric power supplied from the battery to operate the drive motor.

In particular, the inverter is a power converter for operating the drive motor and charging the battery. The inverter converts the electric power of the battery to operate the drive motor for power assist and converts the electric power during regenerative braking to charge the battery.

FIG. 1 is a schematic diagram showing exemplary connection relationships between a battery 1, an inverter, and a drive motor 2. As shown in FIG. 1, the inverter comprises a capacitor module 11 including a plurality of capacitors C, which are related to the electromagnetic wave performance, such as EMI. EMC and the durability of the battery, a power module 12 including a plurality of switching elements S (e.g., Insulated Gate Bipolar Transistors (IGBTs)) for power conversion and a plurality of diodes D (e.g., free wheeling diodes, FWDs), a control unit (not shown) for controlling motor torque and speed, and current sensors 13 for measurement of the u-phase, v-phase, and w-phase currents required for the control.

Recently, with the development of power switching elements, the on/off switching speed of the element is suitably increased and, since the inverter as well as the drive motor is mounted on a vehicle chassis, the switching noise is spread over the entire vehicle during operation of the inverter, which has an effect on vehicle control units and, further, on the vehicle radio reception performance. As a result, a variety of methods for reducing the noise have been studied.

The switching noise generated by the inverter is transmitted to the vehicle chassis via a mounting bracket of the inverter and via the drive motor.

According to prior art methods for reducing the electromagnetic switching noise, a neutral point of a Y-capacitor in a capacitor module of an inverter is connected to a vehicle chassis to suppress the switching noise.

In one example of a method of using the Y-capacitor in the inverter, Japanese Patent Publication No. 2002-078352, incorporated by reference in its entirety herein, discloses a method for protecting an inverter device in which a Y-capacitor is used to remove common mode noise. Japanese Patent Publication No. 2001-045767, incorporated by reference in its entirety herein, discloses an inverter device in which leak current is reduced by feeding a canceling current from an AC neutral point of a Y-capacitor to an earth point via a secondary core of a transformer. U.S. Pat. No. 7,561,389, incorporated by reference in its entirety herein, is directed to an AC voltage output apparatus which reduces noise using a Y-capacitor.

FIG. 2 shows an exemplary inverter comprising a capacitor module 11 including a smoothing capacitor C3 and Y-capacitors C1 and C2 and a power module 12 as a switching noise source.

Preferably, the capacitor module 11 in the inverter using the Y-capacitors C1 and C2 to suppress switching noise has the following functions.

The capacitor module 11 has a smoothing function to suppress a rapid variation of voltage/current of a DC input terminal of the inverter by absorbing a high ripple current generated during the operation of the inverter (differential mode noise suppression). This smoothing function is performed by the smoothing capacitor C3 to allow the inverter to normally operate and, in particular, to increase the durability of a battery 1.

The capacitor module 11 also suppresses common mode noise, which is performed by the Y-capacitors C1 and C2 connected to the smoothing capacitor C3 in parallel in the capacitor module 11.

The ripple current absorbed by the smoothing capacitor C3 is a high current (e.g., more than 50 A), which is suitably consumed by heat generation in the smoothing capacitor C3, and is insulated from the vehicle chassis.

Although the current of switching noise components generated during the operation of the inverter and flowing through the Y-capacitors C1 and C2 in the capacitor module 11 is an extremely low current (e.g., less than 1 mA), it contains a high frequency component, and thus has a significant effect on the electromagnetic wave performance of the inverter and the vehicle. Typically, the specification of the Y-capacitor is determined to have a capacitance which exhibits excellent electromagnetic wave performance from the samples prepared by changing the capacitances of the Y-capacitors.

However, the capacitances of the Y-capacitors C1 and C2 are determined by an experimental approach, not by an analysis and forecasting method. Therefore, it results in a considerable loss of manpower and time, and a considerable cost is incurred to prepare the samples.

Further, the switching noise generated during the operation of the inverter may be transmitted to the drive motor 2, and the switching noise transmitted to the drive motor 2 is delivered to the vehicle chassis, thus causing the problems due to the switching noise. However, there does not appear to be a solution to the switching noise transmitted to the drive motor 2.

Accordingly, there remains a need in the art for capacitor module circuits in an inverter for driving a drive motor of an electric vehicle.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention features methods for forming a capacitor module circuit in an inverter for driving a drive motor of an electric vehicle, which can effectively reduce the switching noise generated during operation of the inverter. The present invention, in preferred embodiments, can particularly solve the problems which require considerable cost and manpower of the prior art methods.

In preferred embodiments, the present invention provides a method for forming a capacitor module circuit comprising a Y-capacitor to suppress a switching noise in an inverter for driving a drive motor of an electric vehicle, the method comprising the steps of: (a) suitably forming a capacitor module by predetermining the capacitance of the Y-capacitor and measuring actual voltage or current waveforms from the Y-capacitor; (b) suitably extracting and separating independent and detailed frequency components by filtering the voltage or current waveforms with respect to frequency bands and forming a parallel equivalent circuit including an impedance resistor, an inductor, and a capacitor at each of the separated frequency components; (c) determining a value of each element by comparing simulation waveforms obtained by sequentially changing the value of each element (resistance, inductance, and capacitance) in the parallel equivalent circuit with the actually measured voltage or current waveforms; and (d) suitably forming an actual capacitor module using the Y-capacitor having the determined capacitance when a parallel impedance equivalent circuit including the elements having the determined values is finally completed.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
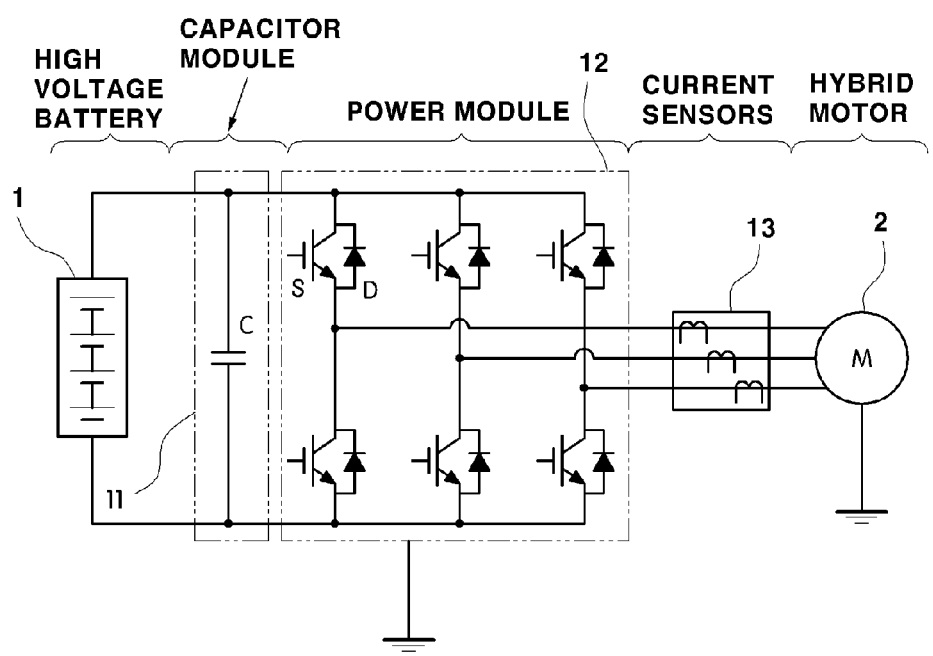
FIG. 1 is a schematic diagram showing the connection relationship between a battery, an inverter, and a drive motor in a typical hybrid vehicle.
Figure 2:
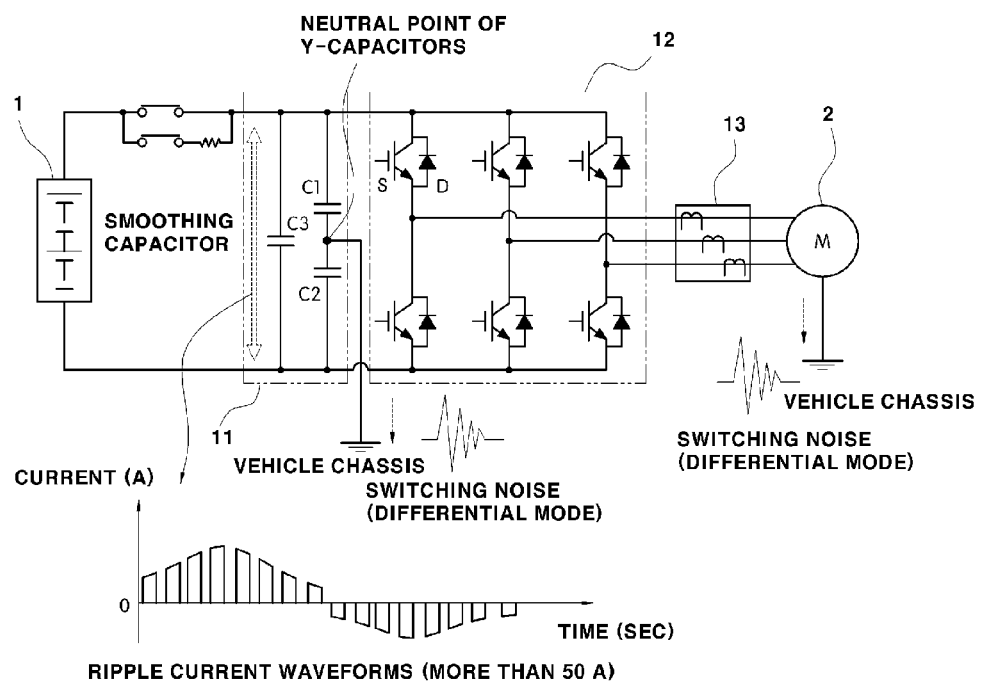
FIG. 2 is a diagram showing the configuration of a capacitor module including a smoothing capacitor and Y-capacitors in a typical inverter.

Reference numerals set forth in the Drawings includes reference to the following elements as further discussed below:

| | |
|---|---|
| 1: | battery |
| 2: | drive motor |
| 11: | capacitor module |
| 12: | power module |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

As described herein, the present invention includes a method for forming a capacitor module circuit including a Y-capacitor to suppress switching noise in an inverter for driving a drive motor of an electric vehicle, the method comprising the steps of (a) forming a capacitor module, (b) extracting and separating independent and detailed frequency components, (c) determining a value of each element, and (d) forming an actual capacitor module.

In one embodiment, the capacitor module is formed by predetermining the capacitance of a Y-capacitor and measuring actual voltage or current waveforms from the Y-capacitor.

In another embodiment, extracting and separating independent and detailed frequency components is carried out by filtering the voltage or current waveforms with respect to frequency bands and forming a parallel equivalent circuit including an impedance resistor, an inductor, and a capacitor at each of the separated frequency components.

In another further embodiment, determining the value of each element is determined by comparing simulation waveforms obtained by sequentially changing the value of each element (resistance, inductance, and capacitance) in the parallel equivalent circuit with the actually measured voltage or current waveforms.

In still another embodiment, the capacitor module is formed using the Y-capacitor having a determined capacitance when a parallel impedance equivalent circuit including the elements having the determined values is completed.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

In preferred embodiments, the present invention provides a method for forming an inverter circuit for operating a drive motor of an environment-friendly electric vehicle such as a hybrid vehicle. More particularly, the present invention preferably provides a method for forming a capacitor module circuit with Y-capacitors for suppressing the electromagnetic wave noise of an inverter, and in particular the switching noise generated by a power module during operation of the inverter.

In preferred embodiments, the circuit formation method of the present invention can suitably form a capacitor module circuit which can suitably reduce the switching noise generated by the inverter.

In certain preferred embodiments, according to the circuit formation method of the present invention, a simulation analysis and forecasting method is suitably employed to determine the capacitances of elements, which preferably constitute a capacitor module, such as Y-capacitors for reducing the switching noise. In further preferred embodiments, the present invention overcomes the problems of the prior art experimental methods, which require considerable cost and manpower to prepare samples. In particular preferred embodiments, an impedance matching method for reducing the switching noise (i.e., electromagnetic wave noise) is suitably employed.

Figure 3:
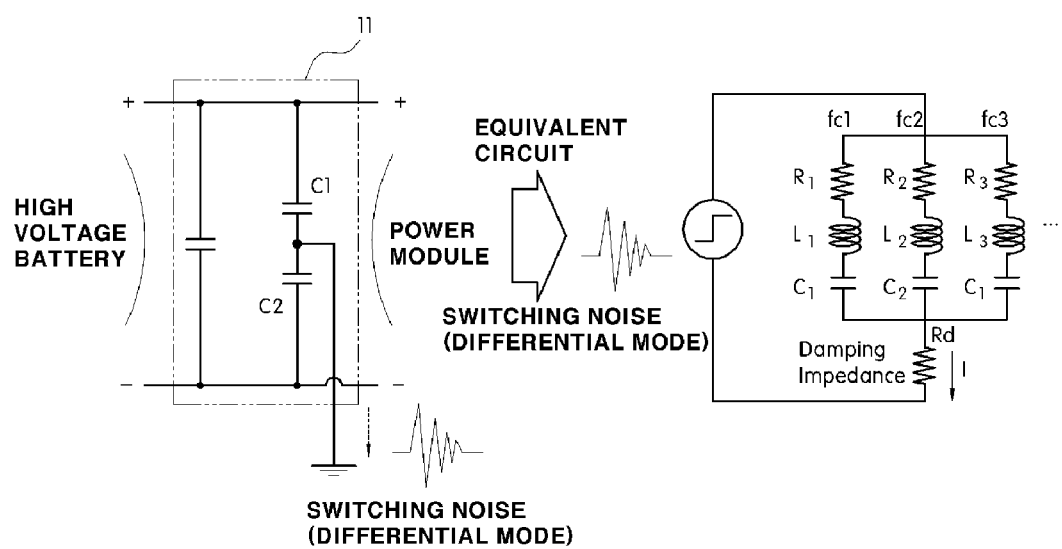
FIG. 3 is a diagram illustrating a circuit formation method in accordance with an exemplary embodiment of the present invention.
Figure 4:
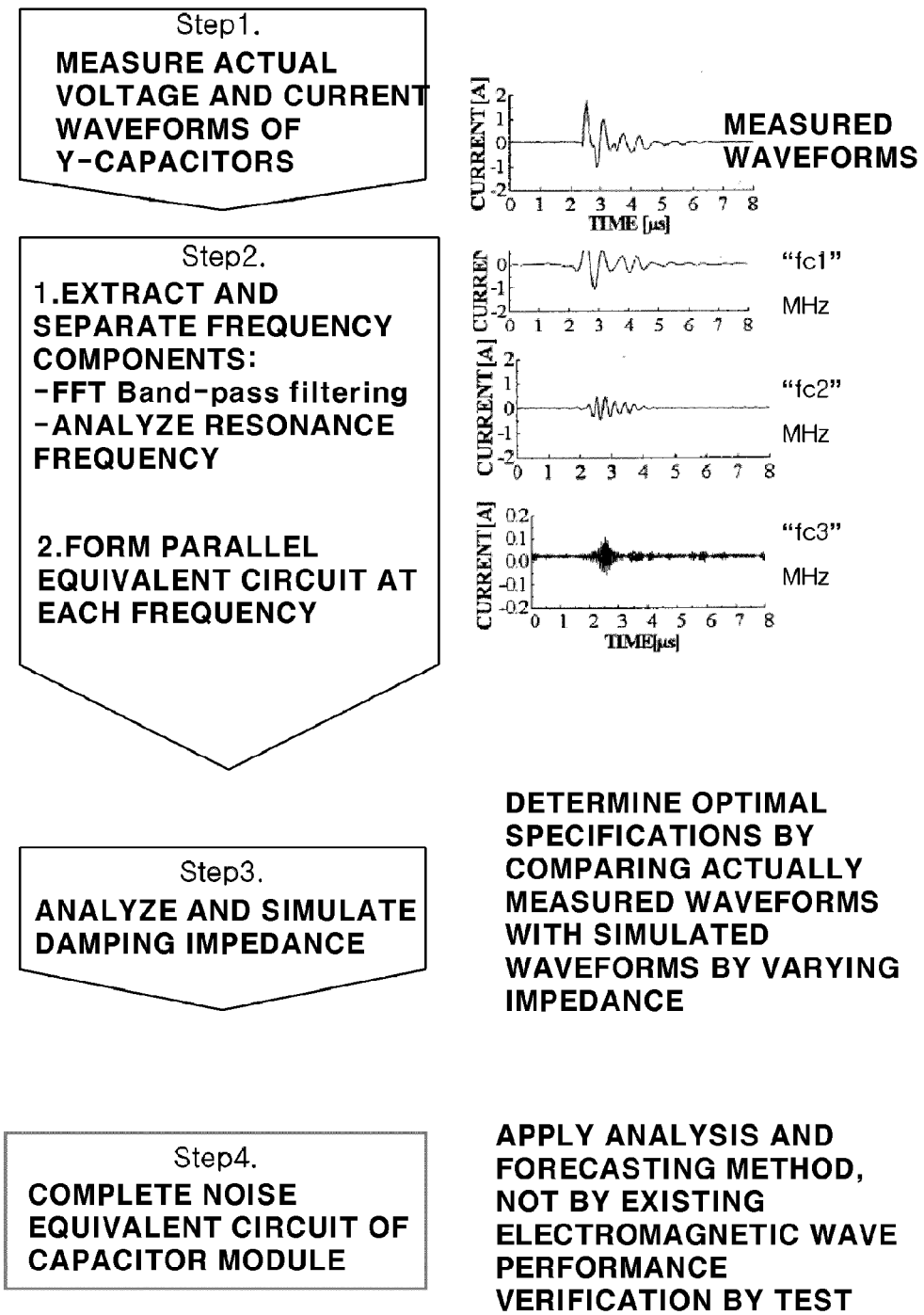
FIG. 4 is a flowchart illustrating a circuit formation method in accordance with an exemplary embodiment of the present invention.
Figure 5:
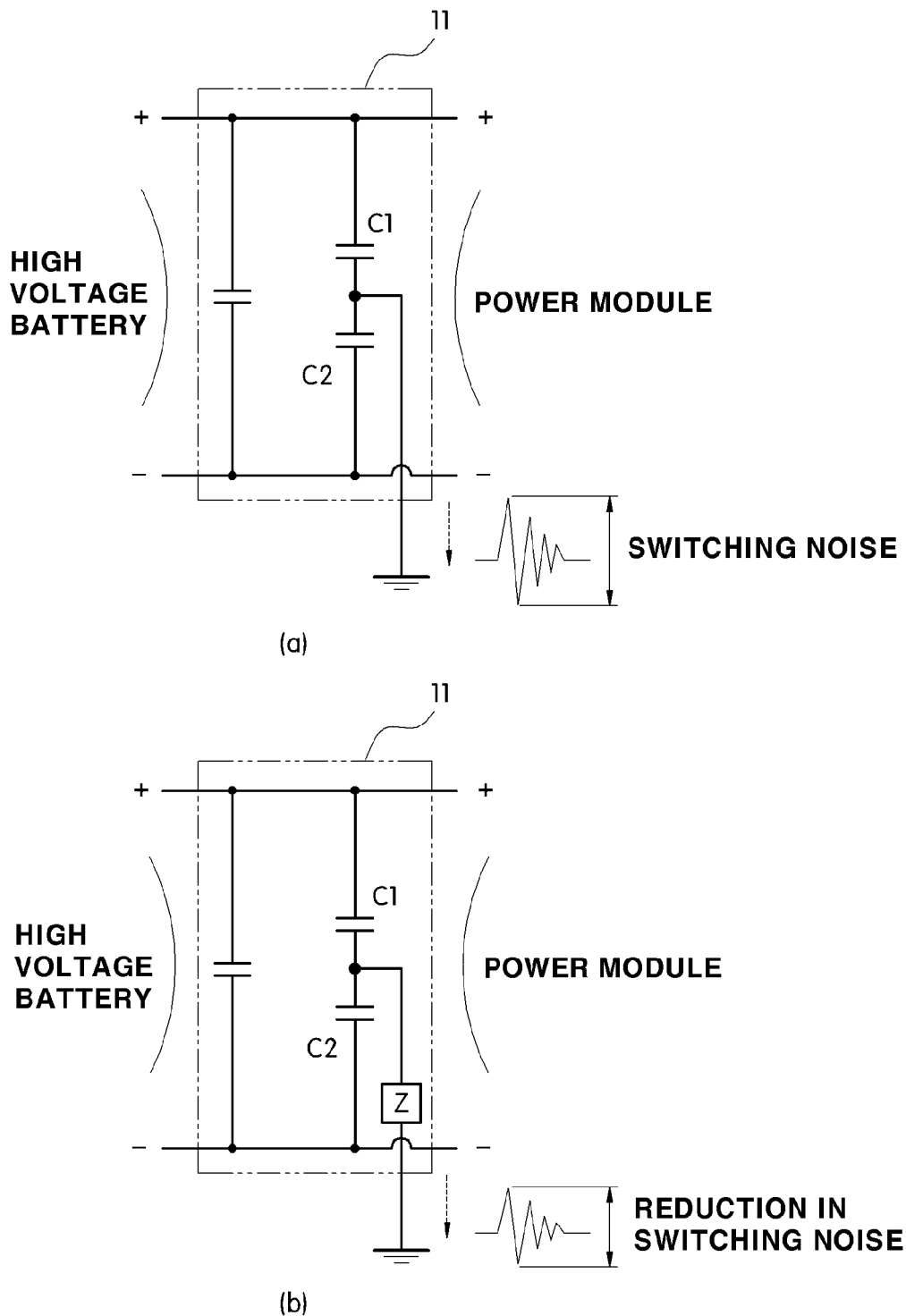
FIG. 5 is a diagram comparing the structure of a prior art capacitor module and that of a capacitor module in accordance with an exemplary embodiment of the present invention.

FIG. 3 is a diagram illustrating a circuit formation method in accordance with an exemplary embodiment of the present invention. FIG. 4 is a flowchart illustrating a circuit formation method in accordance with another exemplary embodiment of the present invention. FIG. 5 is a diagram comparing the structure of a prior art capacitor module and that of a capacitor module in accordance with another exemplary embodiment of the present invention.

According to preferred exemplary embodiments, FIG. 3 shows the configuration of a capacitor module 11 in an inverter and the configuration of an equivalent circuit with damping impedance obtained with respect to the frequency components of the switching noise during the analysis process.

Preferably, in order to reduce the switching noise generated by a power module 12 including a plurality of switching elements S (e.g., IGBTs) and a plurality of diodes D during the operation of the inverter, the neutral point of Y-capacitors C1 and C2 is suitably connected to a vehicle chassis. Preferably, although the present invention also aims at determining optimal capacitances of the Y-capacitors C1 and C2, the capacitances of the Y-capacitance are determined by a simulation analysis and forecasting method while suitably reducing the required cost and manpower, and preferably not by a prior art method in which the capacitances of the Y-capacitors are determined by a test (that is, a plurality of capacitor module samples are suitably prepared and tested by changing the capacitance of the Y-capacitor).

In further preferred embodiments, in the present invention, the damping impedance as well as the capacitances of the Y-capacitors C1 and C2 is analyzed and simulated to further provide a damping impedance circuit (denoted by Z in FIG. 5) suitably configured with a damping resistor R, an inductor L, or the like, if necessary, in which an optimal damping impedance circuit Z is configured based on the capacitances of the Y-capacitors C1 and C2 determined through the simulation.

Preferably, in certain exemplary embodiments of the present invention, the damping impedance circuit Z configured with the damping resistor or the inductor based on the determined capacitances of the Y-capacitors C1 and C2 is further provided, in which the resistance of the damping resistor and the inductance of the inductor are suitably determined in accordance with the capacitances of the Y-capacitors C1 and C2 during the simulation.

According to further preferred embodiments, when the switching noise generated by the power module 12 during the operation of the inverter is suitably transmitted to the vehicle chassis through the Y-capacitors C1 and C2 of the capacitor module 11, a relatively low switching current flows through the Y-capacitors C1 and C2, and this current contains harmonic frequency noise.

Accordingly, in consideration of the harmonic frequency noise contained in the switching current, independent and detailed frequency components are suitably extracted from the current or voltage waveforms, which are actually measured from the Y-capacitors, to form an equivalent circuit, and during which a damping resistance component is variably reflected on the circuit to obtain a damping resistance that minimizes the switching noise current.

The above-described process will be described in detail with reference to FIGS. 3 and 4 below.

In one exemplary embodiment, first, in Step 1, the capacitor module 11 as shown in FIG. 3 is suitably formed by predetermining the capacitances of the Y-capacitors C1 and C2, and the actual voltage or current waveforms are suitably measured from the predetermined Y-capacitors C1 and C2. Preferably, the actual voltage or current waveforms may be measured from the Y-capacitors, of which capacitances are not changed, or both the actual voltage and current waveforms may be suitably measured.

In a further exemplary embodiment, in Step 2, the frequency components are suitably extracted and separated from the actually measured voltage/current waveforms. Preferably, at this time, frequency filtering and resonance frequency analysis are suitably performed to filter the actually measured voltage/current waveforms with respect to the frequency bands, thus extracting and separating independent and detailed frequency components. Accordingly, it is possible to suitably extract and separate the frequency components from the actually measured voltage/current waveforms using a filter that passes only a frequency component of a specific frequency band, i.e., a fast Fourier transform (FFT) bandpass filter. In further preferred embodiments, for example as shown in FIG. 4, FIG. 4 shows examples of fc1, fc2, and fc3, which are the detailed frequency components extracted and separated from the actually measured current waveforms. Preferably, when the separation with respect to the frequency components is made in the above-described manner, a parallel equivalent circuit including resistors R1, R2, and R3, inductors L1, L2, and L3, capacitors C1, C2, and C3, and a damping impedance resistor Rd is suitably formed with respect to each of the separated frequency components.

In still further exemplary embodiments, subsequently, in Step 3, the damping impedance is suitably analyzed and simulated. Preferably, the simulation is performed by changing the impedance in such a manner to change the values of the respective elements, i.e., the resistances of the resistors R1, R2, R3, R4, and Rd and the inductances of the inductors L1, L2, and L3 in the parallel equivalent circuit formed in Step 2. Further, then, the simulation waveforms obtained in each step are compared with the actual voltage or current waveforms obtained in Step 2, thus determining an optimal specification of each element.

In further preferred embodiments, the simulation waveforms are the voltage or current waveforms which can be suitably obtained from the parallel equivalent circuit formed with the elements R1 to R3, Rd, and L1 to L3 having specific resistances and inductances determined during the simulation. Preferably, these simulation waveforms are suitably compared with the actually measured waveforms step by step by changing the values of the respective elements in the equivalent circuit (resistances and inductances) to obtain substantially the same simulation waveforms as the actual waveforms, and the values of the elements in the equivalent circuit having the thus obtained simulation waveforms are finally determined.

Accordingly, as a result, in Step 4, a final equivalent circuit of the capacitor module in which the finally determined values of the elements are suitably reflected is completed.

In further exemplary embodiments, in Steps 3 and 4, the final equivalent circuit is completed by preferably changing the resistance or inductance in the simulation circuit (i.e., parallel equivalent circuit) in the above-described manner to obtain substantially the same simulation waveforms as the actually measured waveforms and, at this time, the simulation may be performed by changing the capacitances of the Y-capacitors C1 and C2.

Preferably, when the final equivalent circuit is completed in Steps 3 and 4, an actual capacitor module is manufactured based on the final equivalent circuit.

According to preferred embodiments, in the above-described steps of the present invention, the capacitances of the Y-capacitors C1 and C2 of the actual capacitor module 11 formed in Step 1 are preferably the values that a designer knows, and the unknown values are the impedance values of the capacitor module, i.e., the resistances and inductances. Therefore, in order to obtain the unknown values, the actual voltage and current waveforms are suitably measured and the simulation circuit (parallel equivalent circuit), and the resistances and inductances in the simulation circuit are suitably adjusted to determine the element values in the simulation circuit that can obtain substantially the same simulation waveforms as the actually measured waveforms.

Preferably, when the simulation circuit that simulates the actual system is completed in the above-described manner, the actual capacitor module is suitably manufactured using the capacitances of the Y-capacitors determined based on the impedance, in which the designer adds the damping impedance circuit Z configured with the resistors and inductors having the resistances and inductances determined by the analysis and forecasting method through the simulation to suitably minimize the switching noise and improve the electromagnetic wave performance.

Preferably, in the above-described simulation process, when the capacitances of the Y-capacitors C1 and C2 are suitably changed to determine the final specifications of the capacitors, the capacitor module 11 is manufactured using the Y-capacitors C1 and C2 having the changed capacitances. Preferably, in the case of the resistors and inductors of the damping impedance circuit Z, their resistances and inductances are suitably determined based on the thus determined capacitances of the Y-capacitors C1 and C2 to configure the damping impedance circuit Z.

Preferably, the damping impedance circuit Z may be suitably configured using either or both of the resistors and inductors.

Accordingly, the present invention forms the capacitor module 11 by determining the capacitances and inductors of the resistors and inductors by the impedance matching method, in which independent and detailed frequency components are suitably extracted to form a parallel equivalent circuit and the impedance of the parallel equivalent circuit is suitably changed to obtain substantially the same simulation waveforms as the actually measured waveforms, and not by the prior art electromagnetic wave performance verification by a test. Further, since the damping impedance circuit Z, which minimizes the switching noise current, is added, it is possible to achieve improved electromagnetic wave performance and noise reduction performance and, at the same time, to more easily determine the capacitances of the Y-capacitors C1 and C2.

According to further preferred embodiments and referring to FIG. 5, in the case of the prior art (a), only the capacitances of capacitors C1 and C2 are determined during the formation of a capacitor module 11 for improving the electromagnetic wave performance, and thereby only the magnitude of the switching noise is reduced. Further, it is necessary to experimentally determine the capacitances of the capacitors C1 and C2 using many samples, and thereby the manpower and manufacturing cost are suitably increased.

On the contrary, in the case of the present invention (b), the damping impedance as well as the capacitances of the capacitors C1 and C2 is suitably analyzed and simulated during the formation of the capacitor module 11 for improving the electromagnetic wave performance, and a damping impedance circuit Z is added to the capacitor module 11 based on the results. Accordingly, it is possible to suitably reduce the magnitude of the noise and control the frequency.

Preferably, the control of the noise magnitude and the frequency is possible by suitably adjusting the capacitances of the Y-capacitors C1 and C2 of the capacitor module 11 and the resistances and inductances of the elements (such as resistors, inductors, etc.) of the damping impedance circuit Z, and suitably arranging the respective elements in the damping impedance circuit Z.

As described herein, according to the methods for forming the capacitor module circuit of the present invention, it is possible to reduce the switching noise generated by the power module during the operation of the inverter. Further, the present invention provides methods that require less cost and manpower to prepare samples than those described in the prior art Further, in connection with the reduction of the switching noise of the inverter as an electromagnetic wave noise source in electric vehicles such as hybrid vehicles, although the prior art methods can only reduce the magnitude of the current and voltage flowing through the Y-capacitors, the present invention can control the frequency as well as the magnitude of the noise through the analysis of noise components.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for forming a capacitor module circuit including a Y-capacitor to suppress switching noise in an inverter for driving a drive motor of an electric vehicle, the method comprising the steps of:
    (a) forming a capacitor module by predetermining the capacitance of the Y-capacitor and measuring actual voltage or current waveforms from the Y-capacitor;
    (b) extracting and separating independent and detailed frequency components by filtering the voltage or current waveforms with respect to frequency bands and forming a parallel equivalent circuit including an impedance resistor, an inductor, and a capacitor at each of the separated frequency components;
    (c) determining a value of each element by comparing simulation waveforms obtained by sequentially changing the value of each element as resistance, inductance, and capacitance in the parallel equivalent circuit with the actually measured voltage or current waveforms; and
    (d) forming the capacitor module circuit using the Y-capacitor having the determined capacitance when a parallel impedance equivalent circuit including the elements having the determined values is finally completed.

2. The method of claim 1, wherein in step (d), the capacitor module is formed by adding a damping impedance circuit including at least one element selected from the group consisting of: a resistor and an inductor in accordance with the final impedance equivalent circuit.

3. The method of claim 1, wherein in step (b), the frequency components are extracted and separated using a bandpass filter that passes only a frequency component of a specific frequency band.

4. The method of claim 1, wherein in step (c), the simulation waveforms are voltage or current waveforms, which are obtained from the parallel equivalent circuit in each step of changing the value of each element, and the values of the elements in the equivalent circuit, which have the same simulation waveforms as the actually measured voltage or current waveforms, are determined.

5. A method for forming a capacitor module circuit including a Y-capacitor to suppress switching noise in an inverter for driving a drive motor of an electric vehicle, the method comprising the steps of:
    (a) forming a capacitor module;
    (b) extracting and separating independent and detailed frequency components;
    (c) determining a value of each element; and
    (d) forming an actual capacitor module circuit,
    wherein the capacitor module is formed by predetermining the capacitance of a Y-capacitor and measuring actual voltage or current waveforms from the Y-capacitor.

6. The method for forming a capacitor module circuit of claim 5, wherein extracting and separating independent and detailed frequency components is carried out by filtering the voltage or current waveforms with respect to frequency bands and forming a parallel equivalent circuit including an impedance resistor, an inductor, and a capacitor at each of the separated frequency components.

7. The method for forming a capacitor module circuit of claim 5, wherein determining the value of each element is determined by comparing simulation waveforms obtained by sequentially changing the value of each element as resistance, inductance and capacitance in the parallel equivalent circuit with the actually measured voltage or current waveforms.

8. The method for forming a capacitor module circuit of claim 5, wherein the capacitor module is formed using the Y-capacitor having a determined capacitance when a parallel impedance equivalent circuit including the elements having the determined values is completed.

* * * * *